US011866011B2

(12) United States Patent
Yamaguchi et al.

(10) Patent No.: US 11,866,011 B2
(45) Date of Patent: Jan. 9, 2024

(54) BLADE ATTACHMENT TOOL AND BLADE SUPPORT STRUCTURE

(71) Applicant: BANDO CHEMICAL INDUSTRIES, LTD., Kobe (JP)

(72) Inventors: Hironori Yamaguchi, Kobe (JP); Hirofumi Miyata, Kobe (JP); Toshikazu Taura, Kobe (JP); Hirokazu Matsukawa, Kobe (JP); Tomoki Hachida, Kobe (JP); Ken Nakano, Yokohama (JP)

(73) Assignee: BANDO CHEMICAL INDUSTRIES, LTD.

( * ) Notice: Subject to any disclaimer, the term of this patent is extended or adjusted under 35 U.S.C. 154(b) by 400 days.

(21) Appl. No.: 17/192,107

(22) Filed: Mar. 4, 2021

(65) Prior Publication Data

US 2021/0188216 A1 Jun. 24, 2021

Related U.S. Application Data

(63) Continuation of application No. PCT/JP2019/032356, filed on Aug. 20, 2019.

(30) Foreign Application Priority Data

Sep. 5, 2018 (JP) ................................ 2018-166419

(51) Int. Cl.
*B60S 1/34* (2006.01)
*B05C 11/04* (2006.01)
(Continued)

(52) U.S. Cl.
CPC ........... *B60S 1/3486* (2013.01); *B05C 11/041* (2013.01); *B05C 11/044* (2013.01);
(Continued)

(58) Field of Classification Search
CPC ........ B60S 1/42; B60S 1/3486; B60S 1/3801; B60S 2001/3813; B60S 2001/3815;
(Continued)

(56) References Cited

U.S. PATENT DOCUMENTS 2,602,178 A * 7/1952 Bayes .................. B60S 1/4006 403/291
2,618,805 A * 11/1952 Rappl .................. B60S 1/4006 15/250.33

(Continued)

FOREIGN PATENT DOCUMENTS

DE 19904112 A1 8/2000
JP H01-167375 U 11/1989

(Continued)

OTHER PUBLICATIONS

International Searching Authority, International Search Report and Written Opinion for International Application No. PCT/JP2019/032356, dated Oct. 8, 2019, (10 pages), Japan Patent Office, Tokyo, Japan.

*Primary Examiner* — Gary K. Graham
(74) *Attorney, Agent, or Firm* — Alston & Bird LLP

(57) ABSTRACT

A blade attachment tool includes a first support member supported by a pressing support portion supporting a blade formed of an elastic member configured to wipe/scrape liquid/solids spreading on an abutment surface by being pressed against the abutment surface and being long in one direction such that the blade is pressed against the abutment surface with a predetermined pressing force, a second support member supported to swing about a swing shaft extending in a longitudinal direction of the blade with respect to the first support member and configured such that a base end side of the blade is attached thereto, and an energizing member configured to apply a reaction force to a friction force that causes the second support member to swing about
(Continued)

the swing shaft with respect to the first support member when the blade is pressed against the abutment surface to slide relatively to the abutment surface.

2 Claims, 6 Drawing Sheets

(51) Int. Cl.
*B60S 1/42* (2006.01)
*B60S 1/38* (2006.01)
*B60S 1/40* (2006.01)

(52) U.S. Cl.
CPC ........... *B05C 11/045* (2013.01); *B60S 1/3801* (2013.01); *B60S 1/40* (2013.01); *B60S 1/42* (2013.01); *B60S 2001/3813* (2013.01); *B60S 2001/3824* (2013.01); *B60S 2001/3836* (2013.01)

(58) Field of Classification Search
CPC .. B60S 1/40; B60S 2001/3824; B05C 11/044; B05C 11/045; B05C 11/041; B05C 11/042
USPC ............. 15/250.361, 250.44, 250.33, 250.46
See application file for complete search history.

(56) References Cited

U.S. PATENT DOCUMENTS 2,618,806 A * 11/1952 MacPherson ......... B60S 1/4006 403/111
5,519,913 A * 5/1996 Schedule ............. B60S 1/3801 15/250.44
5,980,692 A 11/1999 Goodnow et al.
6,836,927 B2 * 1/2005 De Block ................ B60S 1/38 15/250.43

FOREIGN PATENT DOCUMENTS

JP H08-268286 A 10/1996
JP 2001-527172 A 12/2001
JP 2005-152809 A 6/2005
JP 2008-238868 A 10/2008
JP 2010-148715 A 7/2010
JP 2014-162406 A 9/2014

* cited by examiner

BLADE ATTACHMENT TOOL AND BLADE SUPPORT STRUCTURE

CROSS-REFERENCE TO RELATED APPLICATIONS

This is a continuation of International Application No. PCT/JP2019/032356 filed on Aug. 20, 2019, which claims priority to Japanese Patent Application No. 2018-166419 filed on Sep. 5, 2018. The entire disclosures of these applications are incorporated by reference herein.

BACKGROUND

The present disclosure relates to a blade attachment tool and a blade support structure for a blade configured to wipe liquid spreading on an abutment surface or scrape solids spreading on the abutment surface by being pressed against the abutment surface, made of an elastic body, and being long in one direction.

A blade of this type is attached to a pressing support portion that supports the blade such that the blade is pressed against an abutment surface with a predetermined pressing force. When at least one of the abutment surface and the blade moves, the blade relatively moves on the abutment surface, accordingly, and liquid spreading on the abutment surface is wiped. For example, a wiper blade used for wiping a glass of a vehicle is a representative example of the blade.

For example, as described in Japanese Unexamined Patent Publication No. 2008-238868, a wiper blade including a blade rubber that wipes a wiped surface of a vehicle, a spring plate member, and an attachment member connecting the wiper blade to a wiper arm and configured to reciprocate on the wiped surface due to swing of the wiper arm is known. The attachment member includes a swing mechanism and a connecting mechanism, the swing mechanism includes a swing base holding a swing shaft and attached to the spring plate member and a swing portion attached to the swing base via the swing shaft, and the connecting mechanism includes a connecting base provided with a connecting shaft and being capable of swing with the swing portion as one unit and a connecting main body attached to the connecting base via the connecting shaft and configured such that the wiper arm is detachably connected thereto. The wiper blade is configured such that the blade rubber can be smoothly reversed when turning around on a reciprocating path without causing reduction in wiping performance.

As another example, known is a wiper for a window glass of an automobile including a frictional resistance noise elimination device including a main frame and an elastic pressing blade as described in Japanese Unexamined Patent Publication No. 2014-162406. In the wiper for a window glass, in the main frame, a pivot wall is provided in a center thereof, a movable seat having a locking rod is provided in a center of the pivot wall. In each of both side walls of the movable seat, two elliptical working holes are formed in positions on both sides of the locking rod centered therebetween in a lateral direction and fixing pins corresponding to the working holes are provided so as to be pivotably attached and pass through the both side walls of the pivot wall. The movable seat can be elastically moved by the fixing pin using the working holes in the lateral direction, a space is formed between the movable seat and the pivot wall, and an elastically pressing body that energizes the movable seat in a side direction is pivotably attached to each of both sides of the movable seat. The movable seat is elastically energized by the elastically pressing body divided into two and assembled in a two-stage structure, joined to the locking rod and a connector of a wiper arm, and provided in each of both sides of the movable seat between the pivot walls and the movable seat itself moves in accordance with eccentricity of the working holes in the lateral direction formed in the side walls, so that a swing frictional resistance of the wiper absorbs a resistance and a friction force from each direction by appropriately changing an angle of the movable seat and applying an elastic pressure to the movable seat. Thus, a noise eliminating effect can be achieved.

SUMMARY

However, in the wiper blade of Japanese Unexamined Patent Publication No. 2008-238868, the blade rubber can be smoothly reversed when merely turning around in a reciprocating path but, during wiping, an angle of the blade rubber is regulated to be constant by an engagement wall surface and the generation of chattering sound due to deterioration of the state of a glass surface or the like cannot be sufficiently prevented.

In the wiper of Japanese Unexamined Patent Publication No. 2014-162406, energization is performed by an energizing member such that swing about a center (yaw shaft) of the blade in a longitudinal direction is suppressed. However, generally, the blade is long, and therefore, a large rotational moment about the yaw shaft is applied to the yaw shaft. Accordingly, when it is attempted to exert a vibration damping function, a spring constant is increased. Therefore, there is a problem in which the vibration damping function cannot be sufficiently exhibited when only a small friction force is generated in a wet state where the energizing member has become too hard and liquid exists.

In view of the foregoing, the present disclosure has been devised and it is therefore an object of the present disclosure to achieve a stable vibration damping effect of a blade.

In order to achieve the above-described object, in the present disclosure, a blade is supported to swing about a swing shaft extending in a longitudinal direction of the blade and an energizing member that suppresses this swing is provided.

Specifically, according to a first aspect of the present disclosure, a blade attachment tool includes a first support member supported by a pressing support portion supporting a blade formed of an elastic member that is configured to wipe liquid spreading on an abutment surface or scrape solids spreading on the abutment surface by being pressed against the abutment surface and being long in one direction such that the blade is pressed against the abutment surface with a predetermined pressing force, a second support member supported to swing about a swing shaft extending in a longitudinal direction of the blade with respect to the first support member and configured such that a base end side of the blade is attached thereto, and an energizing member configured to apply a reaction force to a friction force that causes the second support member to swing about the swing shaft with respect to the first support member when the blade is pressed against the abutment surface to slide relatively to the abutment surface.

That is, when the blade wipes the liquid on the abutment surface, for example, if a state of the abutment surface is not uniform in a portion in the longitudinal direction of the blade, the liquid is all removed from between the blade and the abutment surface and solid bodies contact one another in some cases. However, according to the above-described configuration, the blade swings about the swing shaft due to increase in friction force caused by contact of the solid bodies to reduce hooking and thus suppress vibration of the blade. When the friction force is reduced again, the energizing member applies a reaction force to the friction force applied to the blade, and therefore, reduction in effect of wiping the liquid due to an excessive inclination of the blade can be prevented. Similarly, in a case where the solids on the abutment surface are scraped, vibration of the blade is suppressed.

According to a second aspect of the present disclosure, in the blade attachment tool of the first aspect, a spring constant of the energizing member is set such that a wiping operation of the liquid is performed in a state where a film of the liquid between the blade and the abutment surface is kept.

According to the above-described configuration, in a case where vibration or chattering sound of the blade is caused by contact of solid bodies of the blade and the abutment surface to one another, the spring constant of the energizing member is determined such that the blade slides in a state where the film of the liquid is kept as much as possible. That is, when the spring constant is too large, the blade is fitted too close to the abutment surface to escape, so that vibration or chattering sound due to a contact of the solid bodies is generated. On the other hand, when the spring constant is too small, the blade is not stabilized and is inclined too much, so that an effect of wiping the liquid is reduced. Note that, the expression "a state where the film of the liquid is kept" means not only a state where the film of the liquid is kept but also an effect exerted such that the film of the liquid is kept as much as possible, and includes a case where there is no liquid on the abutment surface after wiping.

According to a third aspect of the present disclosure, in the blade attachment tool of the first or the second aspect, a spring constant of the energizing member is set based on a maximum rotational moment obtained by multiplying a distance from the swing shaft to the abutment surface when the second support member is fixed to the first support member by a maximum allowable friction force in a dry state where there is no liquid and a maximum allowable rotation angle of the second support member about the swing shaft with respect to the first support member.

According to the above-described configuration, by setting the rotation angle about the swing shaft to an angle equal to or less than the maximum allowable rotation angle, wiping capability of wiping the liquid is maintained. On the other hand, by keeping the rotational moment from exceeding the maximum rotational moment, the generation of vibration or chattering sound of the blade is suppressed. The maximum rotational moment or the maximum allowable rotation angle is appropriately set in accordance with a material, a state, or the like of the abutment surface or the liquid, a pressing force of the pressing support portion, or the like.

According to a fourth aspect of the present disclosure, in the blade attachment tool of any one of the first to third aspects, the blade is a wiper blade that is long in one direction, and the pressing support portion is a wiper arm that presses the wiper blade in a central portion of the wiper blade in the longitudinal direction.

According to the above-described configuration, even when a state of a glass surface or the like as the abutment surface is ununiform in a longitudinal direction of the blade and the glass surface or the like is in a state where vibration or chattering sound of the blade tends to occur, the blade appropriately swings with the wiping effect maintained, so that the generation of vibration or chattering sound is effectively suppressed.

According to a fifth aspect of the present disclosure, in the blade attachment tool of any one of the first to third aspects, the abutment surface is a sheet material that is fed by a cylindrical roller, the liquid is coat liquid that coats a surface of the sheet material, and the blade is formed of an elastic member that is configured to wipe the coat liquid spreading on the abutment surface such that the coat liquid has a uniform thickness on the surface of the sheet material, and is long in one direction.

According to the above-described configuration, even when the state of the surface of the sheet material, such as paper or the like, as the abutment surface is ununiform in the longitudinal direction of the blade and the surface of the sheet material is in a state where vibration or chattering sound tends to occur, the blade appropriately swings with the wiping effect maintained, so that the generation of vibration or chattering sound is effectively suppressed.

In a sixth aspect of the present disclosure, in the blade attachment tool of any one of the first to fifth aspects, as the energizing members, at least one pair of compression coil springs each having one end joined to the first support member and the other end joined to the second support member is provided such that the compression coil springs are located in positions opposed to one another with the swing shaft interposed between the compression coil springs.

According to the above-described configuration, when the second support member swings with respect to the first member, the energizing members act such that one compression coil spring of the at least one pair of compression coil springs is compressed and the other compression coil spring is pulled, and thus, the second support member is returned to an original position.

A blade support structure according to a seventh aspect includes the blade attachment tool of any one of the first to sixth aspects, a blade formed of an elastic member that is configured to wipe liquid spreading on an abutment surface or scrape solids spreading on the abutment surface by being pressed against the abutment surface and being long in one direction such that the blade is pressed against the abutment surface with a predetermined pressing force, and a pressing support portion supporting the blade.

According to the above-described configuration, a blade support structure that can exhibit a stable vibration damping effect of a blade can be provided.

As described above, according to the present disclosure, a blade is supported such that the blade swings about a swing shaft extending in a longitudinal direction of the blade and an energizing member that suppresses this swing is provided. Thus, a stable vibration damping effect of the blade can be exhibited.

DETAILED DESCRIPTION

Embodiments of the present disclosure will be described below with reference to the accompanying drawings.

First Embodiment

Figure 1:
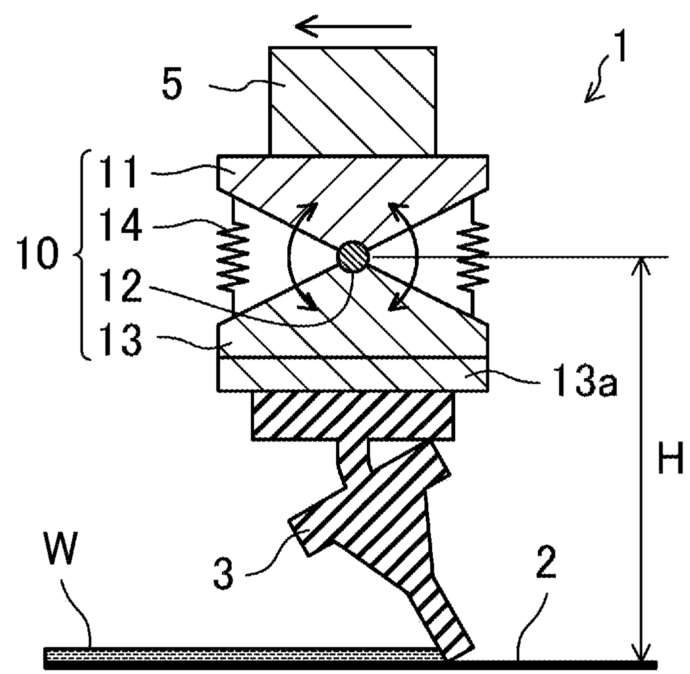
FIG. 1 is a cross-sectional view illustrating an outline of a blade attachment tool according to a first embodiment and a periphery thereof.
Figure 2:
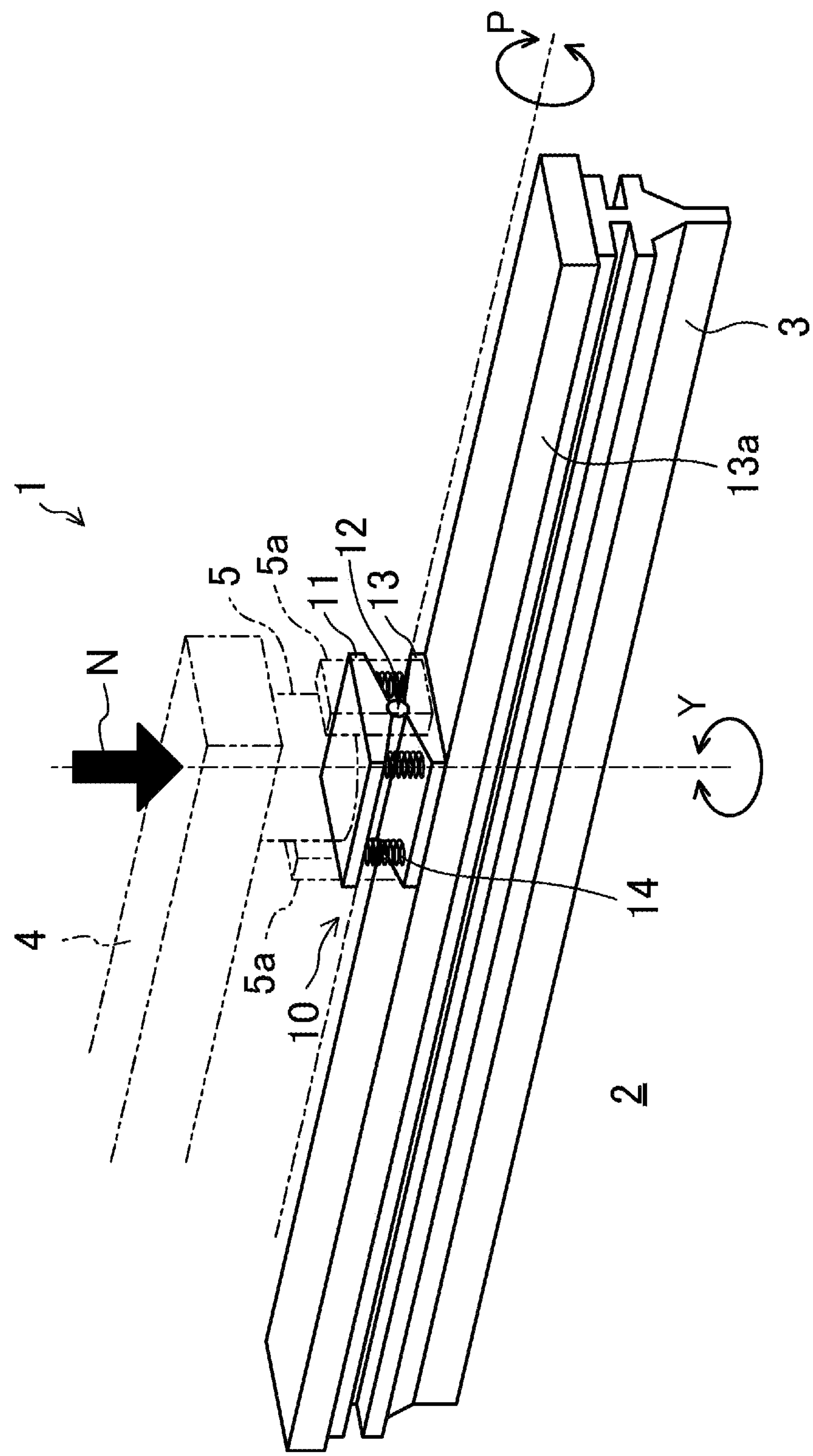
FIG. 2 is a perspective view illustrating the blade attachment tool and the periphery thereof.

FIG. 1 and FIG. 2 illustrate a support structure 1 including a blade attachment tool 10 according to a first embodiment. The support structure 1 includes a blade 3 configured to wipe liquid W, such as rain water or the like, spreading on an abutment surface 2, such as a window glass, or the like, by being pressed against the abutment surface 2, made of an elastic body, and being long in one direction. The abutment surface 2 may be a substantially flat glass surface and may be a slightly curved glass surface. The blade 3 is formed of a wiper rubber having a tapered end portion, for example, as illustrated in FIG. 1 or the like. Note that the blade 3 may include a plate spring extending in a longitudinal direction of the wiper rubber for reinforcement or the like.

The blade 3 is supported by a wiper arm 4 serving as a pressing support portion so as to be pressed against the abutment surface 2 via the attachment tool 10 with a predetermined pressing force N. The blade 3 of this embodiment is not rotatable about a yaw shaft 5 (Y axis) provided in a center of the blade 3 in the longitudinal direction. However, the blade 3 may be configured to be rotatable about the yaw shaft 5, although a configuration of the blade 3 is complicated accordingly. Although not illustrated in detail in the drawings, the wiper arm 4 is configured to press the blade 3 in a direction in which the yaw shaft 5 extends with the predetermined pressing force N by a pressing spring or the like.

Specifically, as illustrated in an enlarged cross-sectional view in FIG. 1, the attachment tool 10 includes a first support member 11 supported by the yaw shaft 5 at an end of the wiper arm 4 and a second support member 13 supported so as to swing about a swing shaft 12 (also referred to as a pitch shaft P) extending in a longitudinal direction of the blade 3 with respect to the first support member 11 and configured such that a base end side of the blade 3 is attached thereto. The swing shaft 12 is supported by a pair of shaft support portions **5*a* provided in the yaw shaft 5, for example, as indicated by the alternate long and two short dashes lines in FIG. 2. The second support member 13 is provided with a lower portion 13*a* in a long plate shape supporting the blade 3, and the lower portion 13*a* extends with the blade 3 in a direction in which the blade 3 extends. The lower portion 13*a* may be configured to cover only a portion of the blade 3 located under the attachment tool 10 and a periphery of the attachment tool 10, not an entire upper side of the blade 3 as illustrated in FIG. 1**.

The attachment tool 10 includes an energizing member 14 configured to push back the second support member 13 that is to swing about the swing shaft 12 with respect to the first support member 11 when the blade 3 is pressed against the abutment surface 2 and slides relatively to the abutment surface 2.

Figure 3:
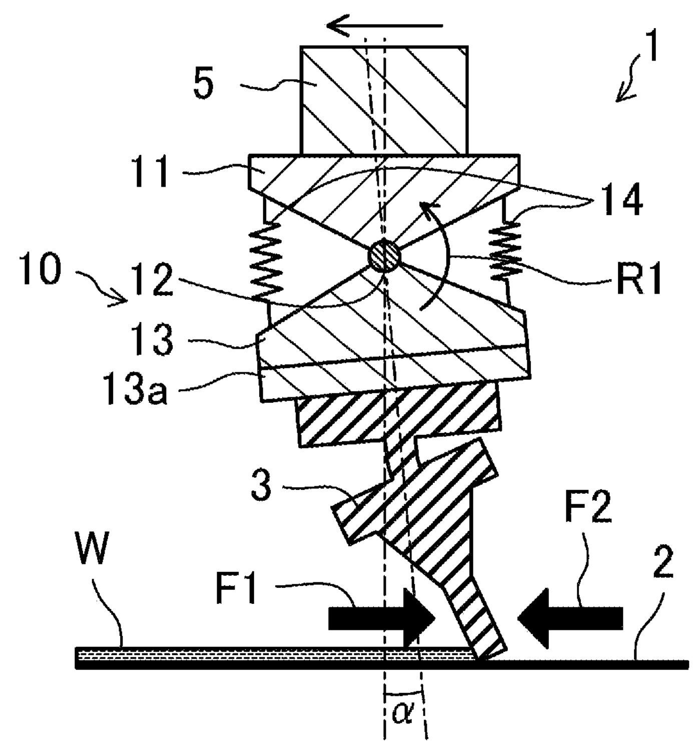
FIG. 3 is a view corresponding to FIG. 1, illustrating how a friction force is applied.

As illustrated in FIG. 1, the energizing member 14 is formed of, for example, two pairs of compression coil springs each having a lower end jointed to the first support member 11 and an upper end joined to the second support member 13 and the two pairs of compression coil springs are disposed so as to be located in positions opposed to one another with the swing shaft 12 interposed therebetween. Only one pair of the compression coil springs may be provided and three or more pairs of the compression coil springs may be provided. By configuring the energizing member 14 in the above-described manner, for example, as illustrated in FIG. 3, one pair of compression coil springs in a right side is compressed and the other pair of compressing coil spring in a left side are pulled when the second support member 13 swings with respect to the first support member 11, and thus, the compression coil springs act to put the second support member 13 back to an original position.

In this case, a spring constant k of the energizing member 14 is set, for example, such that a film of the liquid W between the blade 3 and the abutment surface 2 is kept and a wiping operation of the liquid W is performed in a state where an appropriate friction force that prevents solid bodies, that is, the blade 3 and the abutment surface 2, from contacting one another is maintained. Note that, as the wiping operation of the wiper, wiping is preferably performed such that substantially all the liquid W has been removed from the abutment surface 2 after wiping.

Next, how the spring constant k of the energizing member 14 is determined in the blade attachment tool 10 according to this embodiment will be described.

First, it was found by an experiment or the like that, in the attachment tool 10, in order to effectively exert vibration damping performance, the spring constant k of the energizing member 14 is preferably in a predetermined range.

FIG. 3 illustrates a state where the abutment surface 2 is wiped by the blade 3 attached to the wiper arm 4 by the attachment tool 10. In FIG. 3, the blade 3 slides to left relative to the abutment surface 2. In this case, a friction force F1 acts on the blade 3 from abutment surface 2. The blade 3 (specifically, a wiper rubber portion) is deformed by the friction force F1 and is inclined to an opposite side (a right side in FIG. 3) from a sliding direction. Furthermore, the second support member 13 rotates (in a direction indicated by the arrow R1) counterclockwise from the sliding direction only by a rotation angle $\alpha$. When the second support member 13 rotates, a rotational moment that pushes the second support member 13 back in an opposite direction to the direction indicated by the arrow R1 (clockwise) by an energizing force of the energizing member 14 is generated and causes a spring force F2 in an opposite direction to that of the friction force F1 to act on the blade 3.

The present inventors found that, when the energizing member 14 that generates the spring force F2 that balances with the friction force F1 is used, the vibration damping performance is remarkably exhibited. Thus, it was found that it is preferable that the spring constant k of the energizing member 14 is in a predetermined range.

First, in a case where wiping by the blade 3 is performed, it is preferable in terms of exerting a wiping performance that the blade 3 contacts the abutment surface 2, such as a front glass or the like, in a predetermined rotation angle range. According to this, a rotation angle at which the blade 3 contacts the abutment surface 2 is preferably equal to or less than a maximum allowable rotation angle $\alpha$ max ($\alpha$ max=5 degrees in this case) of the second support member 13 with respect to the first support member 11. Note that a rotation angle α generated by slide of the blade 3 is expressed as a positive angle and a rotation angle α in an opposite direction to that of the positive angle is expressed as a negative angle. In FIG. 3, the blade 3 slides leftward, and thus, the second support member 13 rotates in an opposite direction as indicated by the arrow R1. Therefore, a counterclockwise angle is the positive angle.

The friction force F1 generated between the blade 3 and the abutment surface 2 takes a value in a predetermined range. The friction force F1 is in a different range when the abutment surface 2 is wet (when wet) from a range when the abutment surface 2 is dry (when dry).

Figure 4:
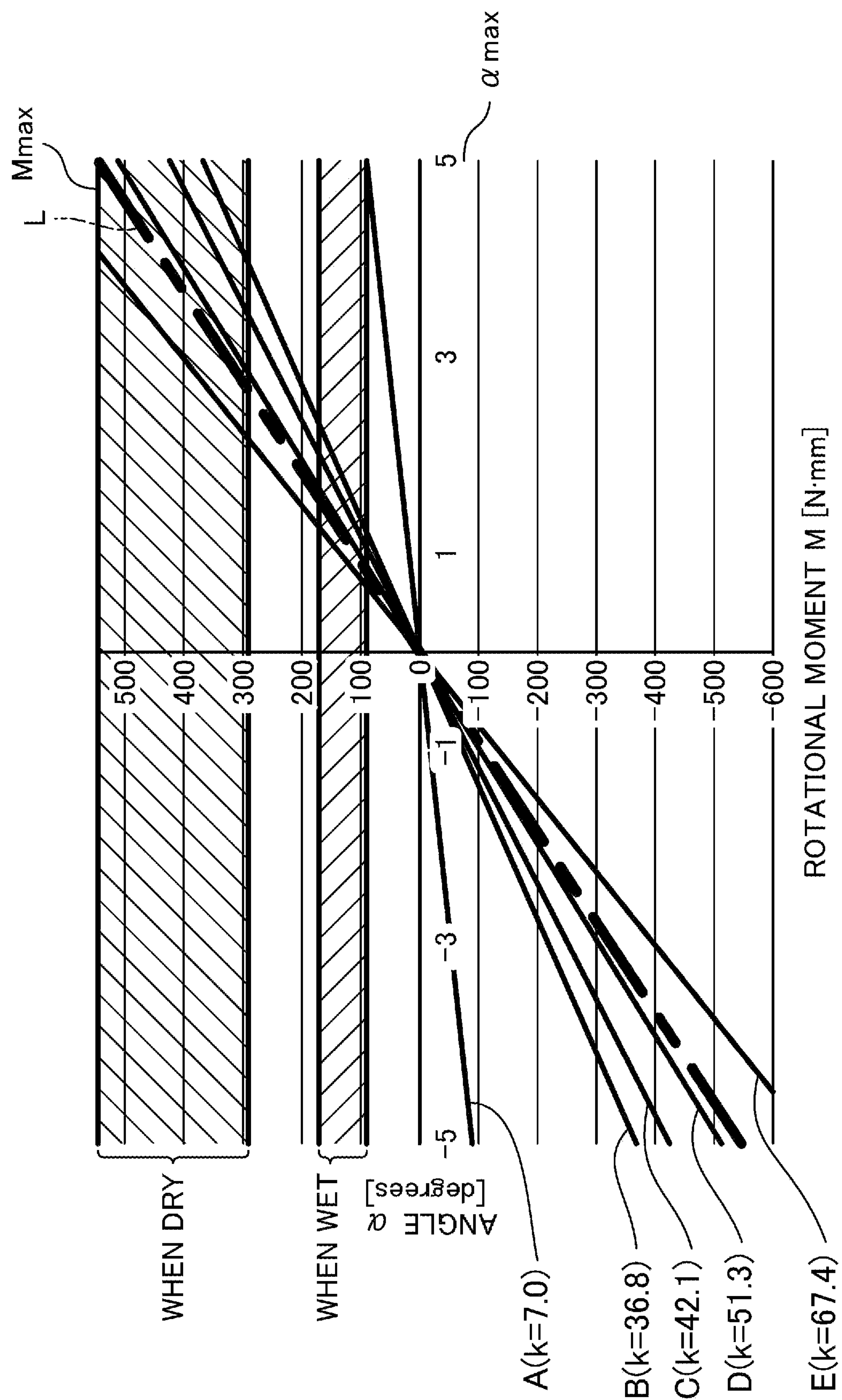
FIG. 4 is a graph illustrating a relationship between a spring constant and a rotational moment.
Figure 7:
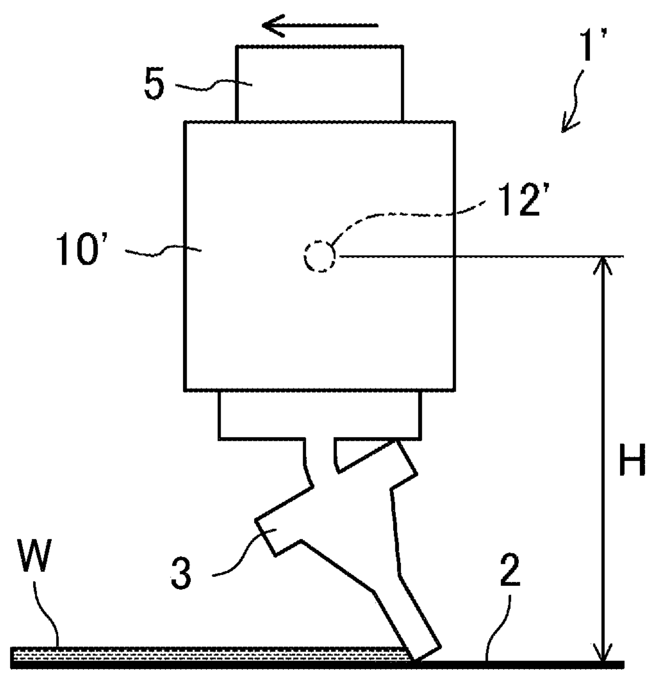
FIG. 7 is a view corresponding to FIG. 1, illustrating a known blade attachment tool with no swing shaft provided thereto and a periphery thereof.

In FIG. 4, the ordinate indicates a magnitude of a friction force applied to the blade 3 by a rotational moment M about the swing shaft 12. For example, as illustrated in FIG. 7, in a known fixed blade attachment tool 10' with no swing shaft provided thereto, a virtual swing shaft 12' is set in the same position as the position of the attachment tool 10 of this embodiment, and the rotational moment M is calculated from a product of a height H from the virtual swing shaft 12' to the abutment surface 2 and a friction force. Then, for example, as illustrated in FIG. 4, when the abutment surface 2 is dry, the rotational moment M is in a range of 288 N·mm or more and 544 N·mm or less and this range is denoted as "WHEN DRY." When the abutment surface 2 is wet, as an example, the friction force is in a range of 88 N·mm ore more and 168 N·mm or less and this range is denoted as "WHEN WET".

Straight lines A to E indicate the rotational moment M indicated by the abscissa for the energizing members 14 having different spring constants k. The rotational moment M is caused by the spring force F2 generated in a case where the second support member 13 rotates only by the rotation angle α about the swing shaft 12. Values in parentheses represent the spring constants k. That is, for the energizing members 14 (a spring A, a spring B, a sprig C, a spring D, and a spring E) corresponding to the straight lines A, B, C, D, and E, the spring constant k is 7.0 N/mm, 36.8 N/mm, 42.1 N/mm, 51.3 N/mm, and 67.4 N/mm in this order.

In this case, the energizing member 14 preferably generates the spring force F2 that balances with the friction force F1. More specifically, the energizing member 14 desirably generates a predetermined rotational moment (the rotational moment M when dry and when wet) in a predetermined range of the rotation angle α (α≤5 degrees in this case).

The spring constant k of the energizing member 14 is set based on the maximum rotational moment M max obtained by multiplying a distance H from the swing shaft 12 to the abutment surface 2 when the second support member 13 is fixed to the first support member 11 by a maximum allowable friction force in a dry state where the liquid W does not exist and the maximum allowable rotation angle α max about the swing shaft 12 allowable for the first support member 11 of the second support member 13. In FIG. 4, a reference spring constant k0 is a spring constant indicated by the straight line L.

In this case, whether the energizing member 14 has a desirable spring constant k is indicated, for example, by whether the corresponding straight line (A to E) indicating the relationship between the rotation angle α and the rotational moment M crosses a range of the rotational moment M (when dry or when wet) under the reference line (the straight line L) indicating the relationship between the maximum allowable rotation angle and the maximum allowable rotation moment M max.

For example, in this embodiment, the spring E does not satisfy the above-described condition. That is, around the rotation angle α=4 degrees, the generated rotational moment M has reached 544 N·mm, but at a point where the rotation angle α=5 degrees, the rotational moment M exceeds the maximum rotational moment M max. The spring constant k is too large, and therefore, when wet, the spring constant k is too hard and the vibration damping effect cannot be sufficiently exhibited.

On the other hand, for the spring D, when the rotation angle α=5 degrees, the rotational moment M is slightly less than 544 N·mm, an inclination of the straight line D is close to an inclination of the straight line L, and an almost desirable spring force F2 can be generated.

In contrast, for the springs A to C, when the rotation angle α=5 degrees, a sufficient rotational moment M is not generated. However, for the springs A to C, with the rotational moment M when wet, an appropriate spring force F2 can be generated when the rotation angle α is equal to or less than 5 degrees. Therefore, in a case where the abutment surface 2 is wet, a sufficient damping performance can be exhibited.

In a case of the energizing member 14 having an even smaller spring constant k than that of the spring A, even when the rotation angle α=5 degrees, the rotational moment M when wet cannot be generated in some cases. For this energizing member 14, the spring constant k is too low and, even in a case where the abutment surface 2 is wet, a vibration damping performance cannot be sufficiently exhibited. However, because of the configuration of the attachment tool 10, an error due to a friction resistance or the like cannot be avoided, and therefore, even with a spring constant of 7.0 N/mm or less, there is a probability that a vibration damping performance is generated.

Note that FIG. 4 merely illustrates an example, and the specific numerical ranges vary depending on various conditions including, for example, a material, a configuration, or the like of the blade 3 (particularly, the wiper rubber portion). However, even when the material, the configuration, or the like is changed, which energizing member 14 having what spring constant k is to be used for a specific range of the friction force F1 generated in the blade 3 can be evaluated in a similar manner to that in FIG. 4.

As understood from the above-described result, the inclination of the reference straight line L can be selected as one setting value (the reference spring constant k0) of the spring constant k but, as described above, particularly, in a case where the spring constant k selected as the setting value is smaller than the reference spring constant k0, a vibration damping effect can be exhibited. Note that, even with a slightly larger spring constant k than the reference spring constant k, a vibration damping effect at a certain level is exhibited. The above-described setting value of the reference spring constant k0 is a mere example, and the reference spring constant k0 can be set in accordance with various conditions.

(Effect Verification)

An effect verification that was performed using a blade/disk type test machine that is a bench testing machine will be described. This test machine employs a line contact of a rubber blade (graphite wiper replacement rubber) having a length of 150 mm and a glass disk (having a diameter of 820 mm and a thickness of 8 mm). The rubber blade and the glass disk were disposed such that a center of the blade was located at a distance of 300 mm from a center of the disk and a longitudinal direction of the blade and a radial direction of the disk matched. The blade was fixed to a blade holder, a vertical load was applied to a center of an upper surface of the blade holder, and the disk was caused to rotate by a motor.

A proper amount of refined water was supplied onto a surface of the disk by spraying, a vertical load (2.4 N) was applied to the blade, and then, the disk and the blade were left for stand still. Thereafter, the disk was caused to rotate at constant speed (5 rpm), in addition to a friction force acting on the blade (a tangential force acting on the blade holder was measured by a load cell), vibration of the blade (vibration speed in a tangential direction in the blade center was measured by a laser doppler vibration meter) and unusual sound (measured by a noise meter) were simultaneously measured.

A friction force is measured by a possible method in accordance with use thereof. In the above-described effect verification using the bench test machine, the tangential force acting on the blade holder was measured by the load cell. Note that, in a case of an automobile wiper blade, a strain gate may be stuck to a wiper arm and a friction force may be calculated from a strain of the arm when a wiper is driven. The friction force F1 herein is an average dynamic friction force of actually measured dynamic friction forces in a rigid support structure that does not have a vibration damping mechanism. The friction force F1 is calculated by averaging all data of stable measured values except for measured values at peaks caused by a static friction. Note that such measurement data for the friction force F1 vary.

Figure 5A:
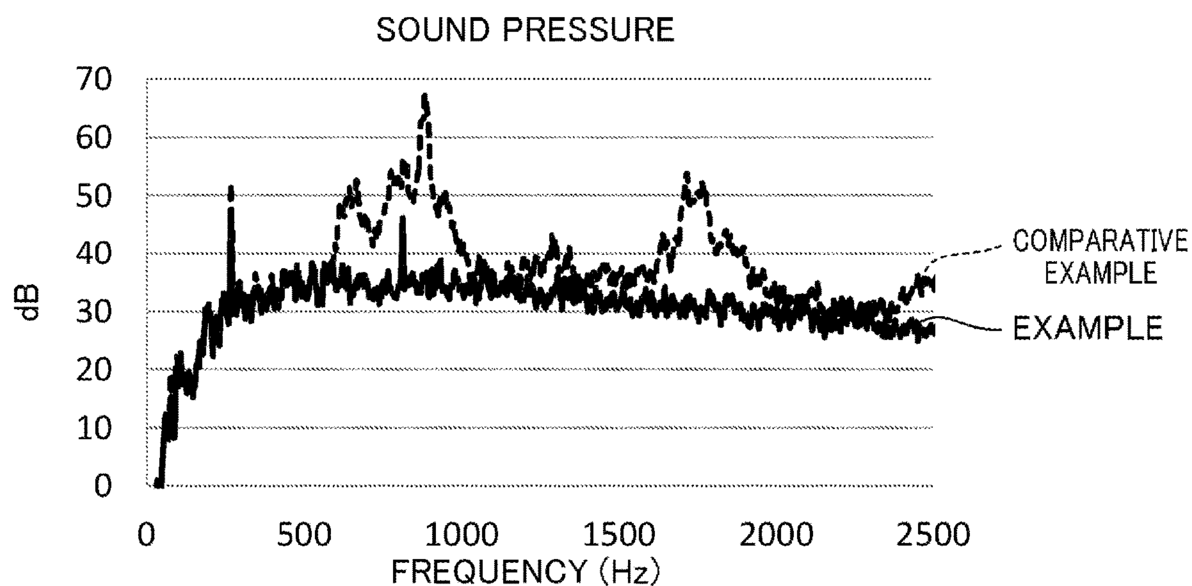
FIG. 5A is a graph illustrating sound pressures of an example and a comparative example in an effect verification test.
Figure 5B:
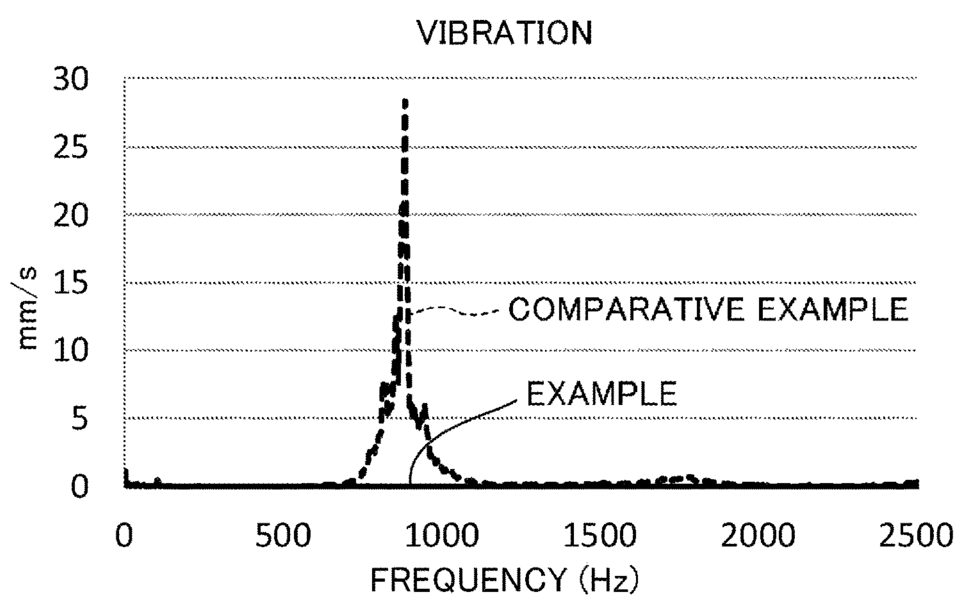
FIG. 5B is a graph illustrating vibration frequencies of an example and a comparative example in an effect verification test.

Results of experiments that were performed using similar compression springs to the energizing member 14 of the above-described first embodiment are illustrated in FIG. 5A and FIG. 5B.

According to results of measurements, a maximum sound pressure in a case where the attachment tool 10 of an example having a vibration damping performance was used was about 52 dB and, on the other hand, a maximum sound pressure in a case where the attachment tool 10' of a comparative example was about 68 dB. Therefore, it was found that, by using the attachment tool 10 of this embodiment, vibration was almost eliminated and the sound pressure could be suppressed by 15 dB or more.

Subsequently, effects of the blade attachment tool 10 according to embodiments of the present disclosure will be described. First, an unillustrated operation section in the driver seat is operated to start an operation of the wiper arm 4. Then, the blade 3 wipes the liquid W on the surface of the abutment surface 2 in accordance with a rotation operation of the wiper arm 4. At this time, if a state of the abutment surface 2 is not uniform in a portion of the blade 3 in the longitudinal direction, the liquid W is all removed from between the blade 3 and the abutment surface 2 and solid bodies contact one another in some cases.

However, in this embodiment, for example, by swing of the blade 3 about the swing shaft 12 due to increase in friction force F1 generated by contact of the solid bodies, hooking of the blade 3 is reduced, and thus, vibration of the blade 3 is suppressed. When the friction force F1 is reduced again, the energizing member 14 pushes the blade 3 back, and therefore, reduction in effect of wiping the liquid W due to an excessive inclination of the blade 3 can be prevented.

In a case where vibration or chattering sound of the blade 3 is caused by a contact of the solid bodies, that is, the blade 3 and the abutment surface 2, the spring constant k of the energizing member 14 is determined such that the blade 3 slides in a state where a film of the liquid W is kept as much as possible. That is, when the spring constant k is too large, the blade 3 is fitted too close to the abutment surface 2 to escape, so that vibration or chattering sound due to a contact of the solid bodies is generated. On the other hand, when the spring constant k is too small, the blade 3 is not stabilized and is inclined too much, so that the effect of wiping the liquid W is reduced.

As described above, in this embodiment, even when a state of the glass surface of the abutment surface 2 or the like is ununiform in the longitudinal direction of the blade 3 and the glass surface of the abutment surface 2 or the like is in a state where vibration or chattering sound of the blade 3 tends to be generated, the blade 3 appropriately swings with a wiping effect maintained so that the generation of the vibration or the chattering can be is effectively suppressed.

In this embodiment, by setting the rotation angle of the swing shaft 12 to the maximum allowable rotation angle $\alpha$ max or less, wiping capability of wiping the liquid W is maintained. On the other hand, by keeping the rotational moment M from exceeding the maximum rotational moment M max, the generation of vibration or chattering sound of the blade 3 is suppressed.

Therefore, with the blade attachment tool 10 according to this embodiment, a stable vibration damping effect of the blade 3 can be exhibited.

Second Embodiment

Figure 6:
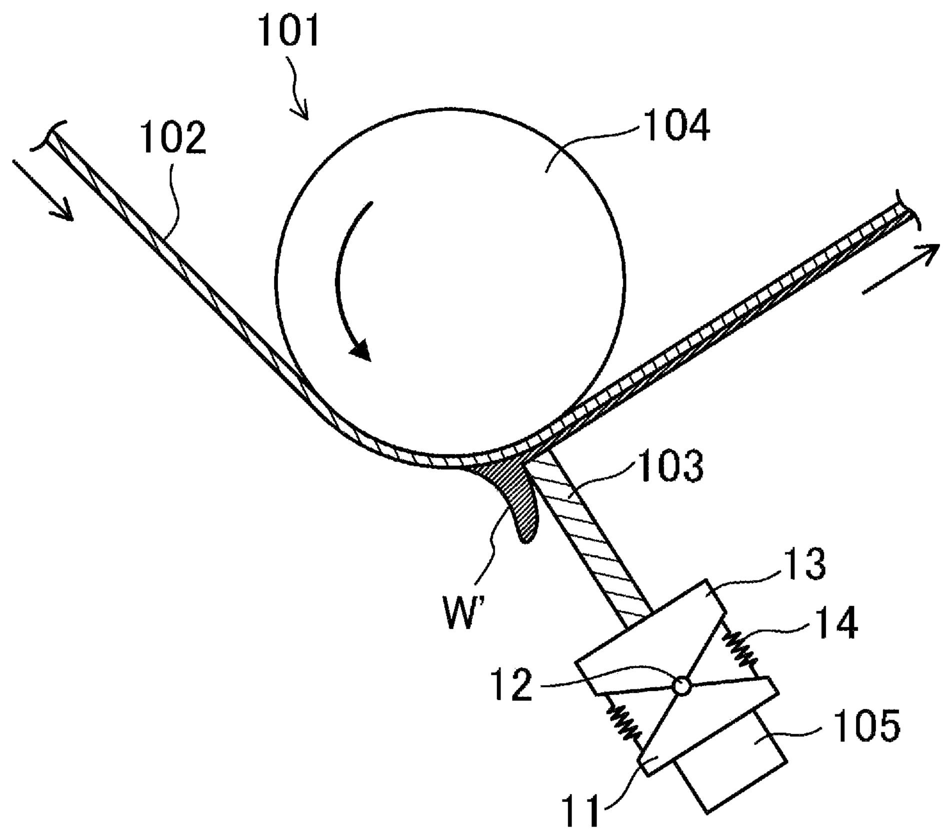
FIG. 6 is a cross-sectional view illustrating an outline of a blade attachment tool according to a second embodiment and a periphery thereof.

FIG. 6 illustrates a second embodiment. The second embodiment is different from the first embodiment particularly in that an abutment surface side moves. Note that, in this embodiment, the same components as those in FIG. 1 to FIG. 4 are denoted by the same reference signs as those in FIG. 1 to FIG. 4 and detailed description thereof will be omitted.

A support structure 101 including a blade attachment tool 10 according to this embodiment is provided in a coater used for coating paper 102 as a sheet material forming an abutment surface with coat liquid W'. In this embodiment, a blade 103 is attached to a second support member 13 similar to that of the first embodiment.

In this coater, the paper 102 is fed by a roller 104 and the blade 103 is configured to slide while being pressed with an appropriate force by a pressing support portion 105 against a surface of the paper 102. Note that the pressing support portion 105 of this embodiment may include a yaw shaft 5 similar to that of the first embodiment but may not include the yaw shaft 5. In short, the rotor may be configured such that the blade 103 can be pressed against the paper 102 with an appropriate pressing force. Thus, the blade 103 slides relatively to the paper 102 moving at constant speed. The surface of the paper 102 is coated while the supplied coat liquid W' is wiped by the blade 103 such that a predetermined uniform thickness of the coat liquid W' is maintained.

In this embodiment, a spring constant k of an energizing member 14 is preferably set such that a wiping operation of wiping the coat liquid W' is performed in a state where a film of the coat liquid W' between the blade 103 and the paper 102 is appropriately kept. That is, when the spring constant k is too small, the generation of vibration or chattering sound cannot be sufficiently prevented, or the blade 103 is inclined too much and thus a thickness of the film of the coat liquid W' cannot be appropriately maintained. On the other hand, when the spring constant k is too large, there is a probability that the coat liquid W' is wiped too much and thus the thickness of the film of the coat liquid W' is too thin or vibration or chattering sound is generated.

In this embodiment, unlike the first embodiment, the spring constant k may be set based on the maximum rotational moment M max when wet.

As described above, in this embodiment, even when a state of a surface of the sheet material of the paper 102 or the like serving as the abutment surface is ununiform in a longitudinal direction of the blade 103 and the surface of the sheet material is in a state where vibration or chattering sound of the blade 103 tends to be generated, the blade 103 appropriately swings with the wiping effect maintained, and thus, the generation of the vibration or the chattering sound is effectively suppressed.

Therefore, also in the support structure 101 including the blade attachment tool 10 according to this embodiment, a stable vibration damping effect of the blade 103 can be exhibited.

Other Embodiments

According to the present disclosure, the above-described embodiments may be implemented in the following configuration.

That is, a plurality of pairs of the energizing members 14 of the first embodiment in which the blade has a reciprocating function are provided and the energizing members 14 are disposed such that one of each of the pairs of the energizing members 14 is compressed and the other one of each of the pairs is pulled. In an embodiment in which a reciprocating function is not provided, however, the energizing members may be provided only in one side, and the energizing members may be configured such that only one of a compression force and a tensile force is applied thereto.

In the first and second embodiments, the energizing members 14 are compression coil springs. However, the energizing members 14 may be tensile coil springs and may be torsion coil springs. Moreover, the energizing members 14 may be rubber springs each of which is configured such that a first support member and a second support member are all filled with rubber.

Note that the above-described embodiments are merely preferable examples and are not intended to be particularly limiting the present disclosure, application of the present disclosure, and the scope of use.

What is claimed is:

1. A blade attachment tool, comprising:

a first support member supported by a pressing support portion supporting a blade formed of an elastic member that is configured to wipe liquid spreading on an abutment surface or scrape solids spreading on the abutment surface by being pressed against the abutment surface and being long in one direction such that the blade is pressed against the abutment surface with a predetermined pressing force;

a second support member supported to swing about a swing shaft extending in a longitudinal direction of the blade with respect to the first support member and configured such that a base end side of the blade is attached thereto; and an energizing member configured to apply a reaction force to a friction force that causes the second support member to swing about the swing shaft with respect to the first support member when the blade is pressed against the abutment surface to slide relatively to the abutment surface; wherein as the energizing member, at least one pair of compression coil springs each having one end joined to the first support member and another end joined to the second support member is provided.

2. The blade attachment tool of claim 1, wherein the compression coil springs are located in positions opposed to one another with the swing shaft interposed between the compression coil springs.

* * * * *